United States Patent
Ikehara

(10) Patent No.: US 8,117,818 B2
(45) Date of Patent: Feb. 21, 2012

(54) STEEL CORD, COMPOSITE OF RUBBER AND STEEL CORD, AND TIRE

(75) Inventor: Kiyoshi Ikehara, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 382 days.

(21) Appl. No.: 12/440,935

(22) PCT Filed: Aug. 23, 2007

(86) PCT No.: PCT/JP2007/066345
§ 371 (c)(1),
(2), (4) Date: Mar. 12, 2009

(87) PCT Pub. No.: WO2008/032538
PCT Pub. Date: Mar. 20, 2008

(65) Prior Publication Data
US 2010/0000645 A1    Jan. 7, 2010

(30) Foreign Application Priority Data
Sep. 14, 2006 (JP) .................. 2006-249705

(51) Int. Cl.
*D02G 3/02* (2006.01)
*D02G 3/48* (2006.01)
(52) U.S. Cl. ........................................ 57/237
(58) Field of Classification Search ............ 57/212, 57/218, 219, 221, 223, 231, 232, 236, 237
See application file for complete search history.

(56) References Cited

U.S. PATENT DOCUMENTS

| 5,819,521 A | * | 10/1998 | Ikehara ............. | 57/214 |
| 2004/0250937 A1 | * | 12/2004 | Miyazaki ............ | 152/527 |
| 2007/0130905 A1 | * | 6/2007 | Kish .................. | 57/237 |
| 2007/0144648 A1 | * | 6/2007 | Sinopoli et al. ...... | 152/527 |
| 2009/0000717 A1 | * | 1/2009 | Ikehara ............. | 152/451 |

FOREIGN PATENT DOCUMENTS

| JP | 2-208101 A | 8/1990 |
| JP | 2005-179859 A | 7/2005 |
| JP | 2006-152483 A | 6/2006 |
| JP | 2006-183211 A | 7/2006 |

* cited by examiner

*Primary Examiner* — Shaun R Hurley
(74) *Attorney, Agent, or Firm* — Sughrue Mion, PLLC

(57) ABSTRACT

A steel cord has a multi-twist structure in which N (N=2 to 8) strands 2 are twisted, each strand 2 being formed by twisting a plurality of element wires 1 and having a substantially elliptical cross-section, wherein d1/d2>1.08 is satisfied, where the major diameter of the strand 2 is represented by d1 and the minor diameter is represented by d2, and $\epsilon_e$ defined by the following equation: $\epsilon_c = \sqrt{(-b/2 + \sqrt{(b^2/4 - c)})} - 1$ (in the equation, b represents $-1 + \pi^2(-4R^2 + d^2)/P^2$, c represents $\pi^2 d^2 k (4\pi^2 R^2 + P^2)/P^4$, R represents $(D-d)/2$, k represents $\tan^2(\pi/2 - \pi/N)$, and d represents $(d1+d2)/2$) satisfies $\epsilon_c > 0.005$, where the diameter of a circle circumscribing the cord is represented by D (mm) and the twist pitch of the cord is represented by P (mm).

13 Claims, 4 Drawing Sheets

STEEL CORD, COMPOSITE OF RUBBER AND STEEL CORD, AND TIRE

TECHNICAL FIELD

The present invention relates to a steel cord, a composite of rubber and steel cord (hereafter may be merely referred to as a "cord" and a "composite", respectively), and a tire. In particular, it relates to a steel cord favorably applied to reinforcement of various rubber products, e.g., tires, belts, hoses, and the like, as well as a composite of rubber and steel cord and a tire, which include the steel cord.

BACKGROUND ART

Steel cords have been used variously for the purpose of reinforcing composites by being embedded in matrices, e.g., rubber. Most of all, the composite of rubber and steel cord in which the rubber is reinforced by the steel cord has been widely applied to various rubber products, e.g., tires, belts, and hoses, because the rubber products can be provided with the strength and rigidity, which are insufficient when the rubber is used alone.

A product including such a composite is produced usually through a step of molding while a matrix is in a fluidized or softened state. In such a process, the steel cord used for reinforcement is stiff and, therefore, the flexibility in molding is frequently restricted. Consequently, regarding the steel cord in the related art, an enhancement of the strength and the rigidity of the product and the flexibility in a production process are mutually contradictory.

In particular, tire is in the shape of a circle, and curved surfaces make up the major part thereof. Therefore, flexibility is required in the production process. Particularly in the vulcanization step thereof, expansion is usually conducted in an oven in order to fit to a mold. On the other hand, regarding a completed product, high strength and rigidity and dimensional stability are important to endure long-term severe use and deliver stable performance. In particular, a crown portion of the tire is constantly subjected to a tensile force in a circumferential direction because of an internal pressure during use, and the circumference is elongated through creep due to use. Consequently, strain may be generated so as to deteriorate the durability and a cross-sectional shape of the tire may be changed so as to deteriorate the wear resistance characteristic.

On the other hand, as for a technology related to strengthening a tire crown portion, for example, Patent Document 1 discloses a technology of efficiently preventing separation without increasing the weight of the tire by disposing two interlacing layers and at least one crown strengthening layer located under the interlacing layers and formed from a strip, in which a reinforcing element composed of a plurality of corrugated or zigzag cords (or filaments) are oriented along an equator as a whole, in a tread portion around a carcass.

Furthermore, in Patent Document 1 described above, it is also disclosed that the use of the strip serving as the crown strengthening layer, in which a plurality of corrugated or zigzag cords or filaments are oriented along an equator as a whole, is simple in the production because elongation is achieved easily in vulcanization.

Patent Document 1: Japanese Unexamined Patent Application Publication No. 2-208101 (Claims and the like)

DISCLOSURE OF INVENTION

Problems to be Solved by the Invention

However, regarding the technology disclosed in Patent Document 1 described above, in order to allow this steel cords to exhibit sufficient rigidity after a product is completed, it is necessary that the above-described corrugated or zigzag shape is almost eliminated by being straightened in the state in which an internal pressure is applied to the product. Consequently, high precision is required in the molding step in order to match the properties of the product tire to desired values. Therefore, there are problems from the viewpoint of the production efficiency.

Accordingly, the object of the present invention is to provide a steel cord which has no production problem noted in the related art and which can be produced efficiently with stable quality, particularly a steel cord useful for the purpose of reinforcing a tire crown portion, as well as a composite of rubber and steel cord and a tire, which include the steel cord.

Means for Solving the Problems

In order to solve the above-described problems, a steel cord according to the present invention comprises a multi-twist structure in which N (N=2 to 8) strands are twisted, each strand being formed by twisting a plurality of element wires and having a substantially elliptical cross-section, wherein d1/d2>1.08 is satisfied where the major diameter of the above-described strand is represented by d1 and the minor diameter is represented by d2, and $\epsilon_c$ defined by the following equation:

$$\epsilon_c = \sqrt{(-b/2 + \sqrt{(b^2/4 - c)})} - 1$$

(in the equation, b represents $-1 + \pi^2(-4R^2 + d^2)/P^2$, c represents $\pi^2 d^2 k(4\pi^2 R^2 + P^2)/P^4$, R represents (D−d)/2, k represents $\tan^2(\pi/2 - \pi/N)$, and d represents (d1+d2)/2) satisfies $\epsilon_c > 0.005$, preferably $\epsilon_c > 0.015$, where the diameter of a circle circumscribing the cord is represented by D (mm) and the twist pitch of the cord is represented by P (mm).

In the steel cord according to the present invention, it is preferable that all directions of major axes of the above-described N strands are substantially the same direction and are the same direction with respect to the longitudinal direction of the cord. It is also preferable that the cord has a substantially elliptical cross-section and D1/D2>1.02 is satisfied, where the major diameter of the cord is represented by D1 and the minor diameter is represented by D2. In the steel cord according to the present invention, it is preferable that the structure of the above-described N strands is a 2+n+m structure and two core element wires are substantially not twisted, but are arranged in parallel, the structure of the above-described N strands is a 2+n structure and two core element wires are substantially not twisted, but are arranged in parallel, or the structure of the above-described N strands is a 1+n structure and one core element wire is patterned with a corrugated shape.

A composite of rubber and steel cord according to the present invention includes the above-described steel cord according to the present invention embedded in rubber. In the composite according to the present invention, it is preferable that at least one gap is present between the above-described N strands.

Furthermore, a tire according to the present invention includes a reinforcing layer in which the above-described composite of rubber and steel cord according to the present invention is used as a reinforcing member. Preferably, the above-described reinforcing layer is formed by winding the above-described reinforcing member at least one turn around a tire crown portion.

More specifically, a tire according to the present invention includes at least one carcass, which serve as a skeleton and which is present extending in a toroidal shape lying astride at least one pair of bead cores, and at least one layer of belt, which is disposed on the outer periphery of the carcass and which includes a reinforcing element composed of a plurality of cords or filaments having an inclination angle of 10° to 40° relative to a tire equator plane, wherein at least one crown strengthening layer formed from a strip, in which the above-described composite of rubber and steel cord according to the present invention is oriented along the circumferential direction of the tire as a whole, is disposed on the inner periphery of the above-described belt and on the outer periphery of the above-described carcass.

Moreover, another tire according to the present invention includes at least one carcass, which serve as a skeleton and which is present extending in a toroidal shape lying astride at least one pair of bead cores, and at least two layers of interlacing belts, which are disposed on the outer periphery of the carcass and which include reinforcing elements composed of a plurality of cords or filaments having an inclination angle of 10° to 40° relative to a tire equator plane in such a way that the reinforcing elements of the two layers intersect with the equator plane therebetween, wherein at least one crown strengthening layer formed from a strip, in which the above-described composite of rubber and steel cord according to the present invention is oriented along the circumferential direction of the tire as a whole, is disposed on the inner periphery of the above-described interlacing belt and on the outer periphery of the above-described carcass.

Advantages

According to the present invention, since the above-described configuration is employed, a steel cord which has no production problem noted in the related art and which can be produced efficiently with stable quality, particularly a steel cord useful for the purpose of reinforcing a tire crown portion, as well as a composite of rubber and steel cord and a tire, which include the steel cord, can be realized.

Figure 1:
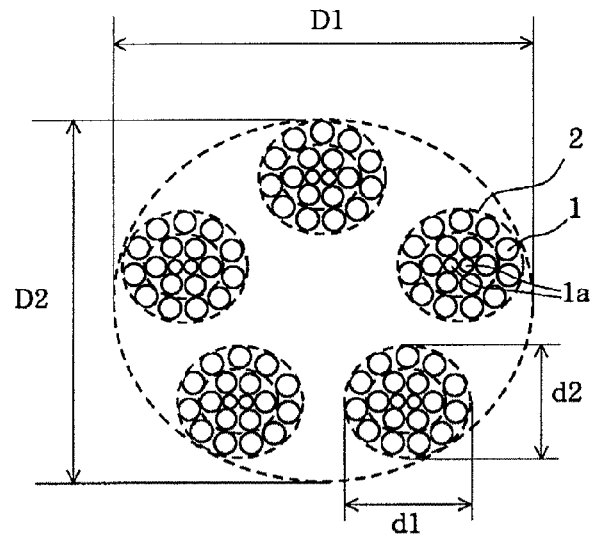
FIG. 1 is a sectional view showing an example of a steel cord according to the present invention.

REFERENCE NUMERALS 1, 11, 21 element wire
1a, 11a, 21a core element wire
2, 12, 22 strand
100 tire
101 carcass
102 interlacing belt
103 crown strengthening layer

BEST MODES FOR CARRYING OUT THE INVENTION

The preferred embodiments according to the present invention will be described below in detail.

FIG. 1 is a sectional view showing an example of a steel cord according to the present invention. As shown in the drawing, the steel cord according to the present invention has a multi-twist structure in which N (N=2 to 8) strands 2, in the example shown in the drawing, five strands, are twisted while each strand is formed by twisting a plurality of, preferably 3 to 20 of element wires 1.

Furthermore, as shown in the drawing, the strand 2 constituting the cord according to the present invention has a substantially elliptical cross-section, and when the major diameter of the strand is represented by d1 and the minor diameter is represented by d2, the ratio thereof, d1/d2, satisfies d1/d2>1.08. Consequently, even if there are gaps between the strands 2, the outer diameter of the cord does not become large easily and, therefore, the gauge of the product can be made small.

Moreover, regarding the cord according to the present invention, $\epsilon_c$ defined by the following equation:

$$\epsilon_c = \sqrt{(-b/2 + \sqrt{(b^2/4 - c)})} - 1$$

(in the equation, b represents $-1 + \pi^2(-4R^2 + d^2)/P^2$, c represents $\pi^2 d^2 k (4\pi^2 R^2 + P^2)/P^4$, R represents $(D-d)/2$, k represents $\tan^2(\pi/2 - \pi/N)$, and d represents $(d1+d2)/2$) satisfies $\epsilon_c > 0.005$, where the diameter of a circle circumscribing the cord is represented by D (mm) and the twist pitch of the cord is represented by P (mm).

Since $\epsilon_c$ defined by the above-described equation satisfies $\epsilon_c > 0.005$, preferably $\epsilon_c > 0.015$, as shown in the drawing, a predetermined extent of or more gaps are formed in at least one place between N strands 2 in a steel cord, and in the example shown in the drawing, between all strands 2. Therefore, even in the case where the steel cord is embedded in a matrix, e.g., rubber, gaps are present between the strands 2. Consequently, when the matrix is in a soft state, elongation can easily deal with some extent of strain while tensile strain is applied to the cord. Hence, there are merits that molding of a product becomes easy and production is conducted easily because an allowance for vulcanization expansion in tire production increases.

On the other hand, when the fluidity of the matrix is reduced similarly to that of rubber after vulcanization, even if there are gaps between the strands 2 as described above, the steel cord cannot deform to reduce the gaps in a manner similar to that of a coil spring, and the rigidity intrinsic to steel is exerted in a manner similar to that in the case where no gap is present. Consequently, the tensile rigidity of the steel cord according to the present invention in a product is not easily affected by the magnitude of strain applied to the steel cord during processing, and high rigidity is exhibited constantly.

Furthermore, in the cord according to the present invention, it is preferable that all directions of major axes of the N strands 2 are substantially the same direction and are the same direction with respect to the longitudinal direction of the cord. In the case where the directions of major axes of individual strands 2 constituting the cord are uniform and are directed in the same direction with respect to the longitudinal direction of the cord, the cord itself becomes flat and, thereby, the gauge of the product can be made smaller.

Furthermore, in the present invention, it is also preferable that the cord has a substantially elliptical cross-section and when the major diameter of the cord is represented by D1 and the minor diameter is represented by D2, the ratio thereof, D1/D2, satisfies D1/D2>1.02. Consequently, the gauge of the product can be made smaller. Incidentally, in this case, the diameter D of a circle circumscribing the cord is expressed as D=(D1+D2)/2.

Furthermore, regarding the product, the state in which gaps remain between strands is preferable from the viewpoint of the fatigability. As described above, according to the cord of the present invention, even in such a state, the tensile rigidity is not reduced significantly as compared with that in the case where strands 2 are closely contact each other.

Figure 2:
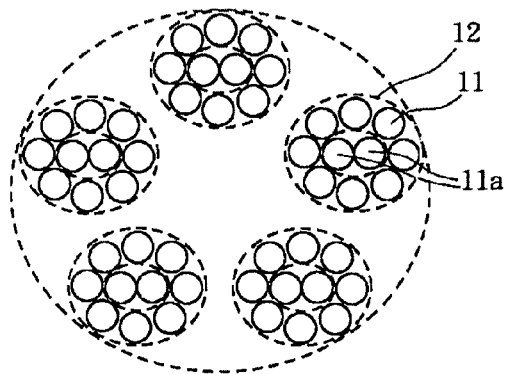
FIG. 2 is a sectional view showing another example of a steel cord according to the present invention.
Figure 3:
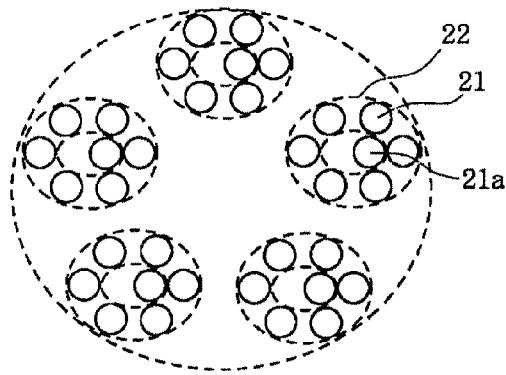
FIG. 3 is a sectional view showing further another example of a steel cord according to the present invention.

In the present invention, specific examples of the structure of the strands 2 can include a structure which is a 2+n+m structure, as strands 2 shown in FIG. 1, and in which two core element wires 1a are substantially not twisted, but are arranged in parallel, a structure which is a 2+n structure, as strands 12 shown in FIG. 2, and in which two core element wires 11a are substantially not twisted, but are arranged in parallel, and a structure which is a 1+n structure, as strands 22 shown in FIG. 3, and in which one core element wire 21a is patterned with a corrugated shape. In this case, when the cord is embedded in rubber, the rubber penetrates into the inside of the cord. Therefore, even if the product is wound externally, spreading or the like of rust due to intrusion and diffusion of moisture therefrom does not occur easily. This is favorable.

In this manner, according to the present invention, a steel cord which can be produced efficiently and which can exert sufficient rigidity as a reinforcing member after a product tire is produced, as well as a composite of rubber and steel cord, in which the steel cord is embedded in the rubber, can be realized.

Moreover, it is enough that a tire according to the present invention includes the reinforcing layer in which the composite of rubber and steel cord according to the present invention is used as a reinforcing member. Consequently, a desired high rigidity is exerted by the reinforcing layer and, thereby, a tire excellent in durability and wear resistance can be realized. In particular, the present invention is useful for being applied to truck-bus (TBR) tires which are used under high internal pressures and in which high tensions in circumference directions are applied to crown portions. Preferably, the tire according to the present invention includes a reinforcing layer formed by winding the reinforcing member composed of the above-described composite of rubber and steel cord at least one turn around a tire crown portion.

Figure 4:
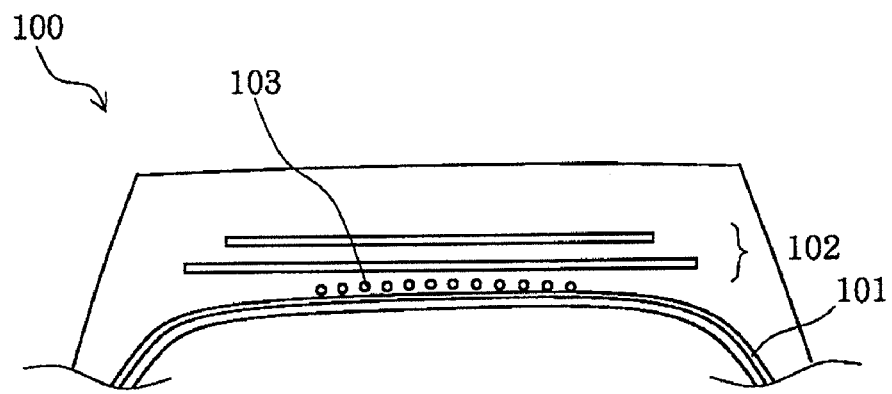
FIG. 4 is a magnified sectional view showing the vicinity of a tread portion of an example of a tire according to the present invention.

FIG. 4 is a magnified sectional view showing the vicinity of a tread portion of an example of a tire according to the present invention, the tire including the composite of rubber and steel cord according to the present invention as a reinforcing member. A tire 100 shown in the drawing includes at least one carcass 101, which serve as a skeleton and which is present extending in a toroidal shape lying astride at least one pair of bead cores (not shown in the drawing), and at least two layers of interlacing belts 102, which are disposed on the outer periphery of the carcass 101 and which include reinforcing elements composed of a plurality of cords or filaments having an inclination angle of 10° to 40° relative to a tire equator plane, i.e., a plane including a center circumference of the tire, in such a way that the reinforcing elements of the two layers intersect with the equator plane therebetween, wherein at least one crown strengthening layer 103 formed from a strip, in which the above-described composite of rubber and steel cord is oriented along the circumferential direction of the tire as a whole, is disposed on the inner periphery of the interlacing belt 102 and on the outer periphery of the carcass 101.

The effects of the present invention are not limited to the example shown in the drawing, but are exerted with respect to any tire. However, as described above, the present invention is effective particularly with respect to the TBR tire. Most of all, it is preferable that the composite according to the present invention is applied to the crown strengthening layer 103 formed from a strip with the orientation along the circumferential direction of the tire having the structure shown in FIG. 4 because elongation is achieved easily in vulcanization so as to simplify the production and, in addition, variations in product properties along with variations in expansion during vulcanization are reduced, so that stable quality can be ensured.

Although not shown in the drawing, it is needless to say that regarding a tire provided with one layer of belt, which includes a reinforcing element composed of a plurality of cords or filaments having an inclination angle of 10° to 40° relative to a tire equator plane, instead of the interlacing belts 102, the effects similar to the above-described effects are obtained by disposing a crown strengthening layer, to which the composite according to the present invention is applied as a reinforcing member, on the inner periphery of the above-described belt and on the outer periphery of the carcass.

Moreover, it is enough that a tire according to the present invention includes the above-described composite of rubber and steel cord according to the present invention, applied as a reinforcing member for the crown strengthening layer. Consequently, desired effects of the present invention can be exerted. The specific tire structure, the material, and the like, e.g., a specific cord diameter, a twist pitch, and the number of reinforcing members embedded in the reinforcing layer, can be appropriately set according to a common method, and are not specifically limited.

EXAMPLES

The present invention will be described below in detail with reference to examples.

Comparative Example

Figure 5:
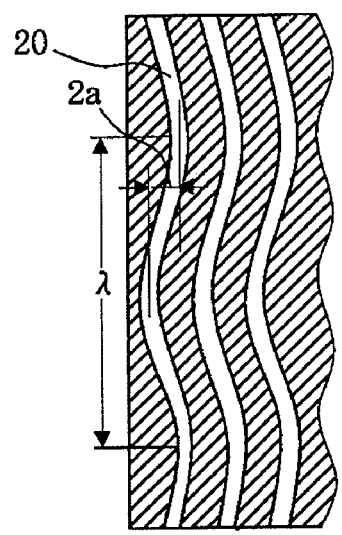
FIG. 5 is a sectional view showing a composite of rubber and steel cord according to a Comparative example.

As shown by a plan view in FIG. 5, cords 20 which have a 2+6+11 structure and which have been generally previously used as reinforcing members for a TBR tire were patterned with a corrugated shape (wavelength: λ, amplitude: 2a). The cords 20 were arranged in parallel and were embedded into rubber, so that a composite of rubber and steel cord of Comparative example was prepared.

Example 1

A composite of rubber and steel cord of Example 1 was prepared by twisting five strands, as shown in Table 1 described below, having a 2+6+11 structure (two core element wires were substantially not twisted, but are arranged in parallel) and a substantially elliptical cross-section, as shown in FIG. 1, and embedding the resulting twisted strands into rubber.

Example 2

A composite of rubber and steel cord of Example 2 was prepared by twisting five strands, as shown in Table 1 described below, having a 2+8 structure (two core element wires were substantially not twisted, but are arranged in parallel) and a substantially elliptical cross-section, as shown in FIG. 2, and embedding the resulting twisted strands into rubber.

Example 3

A composite of rubber and steel cord of Example 3 was prepared by twisting five strands, as shown in Table 1 described below, having a 1+6 structure (one core element wire was patterned with a corrugated shape) and a substantially elliptical cross-section, as shown in FIG. 3, and embedding the resulting twisted strands into rubber.

Values of the major diameters d1 and minor diameters d2 of the strands, the major diameters D1 and minor diameters D2 of the cords, and the code twist pitches P and $\epsilon_c$ of the composites obtained in Examples 1 to 3 are shown in Table 1 described below. Furthermore, all major axes of individual strands of each of the composites of Examples 1 to 3 were load of 25,480 N (2,600 kgf) was applied. After the traveling, the center groove depth and the shoulder groove depth were measured, and the amounts of wear relative to a fresh state were compared. As a result, regarding Comparative example, there was a difference of 2 mm or more, whereas regarding each of tires in individual Examples, the difference was within 1 mm. Therefore, regarding Examples, it was ascertained that uneven wear resistance was improved.

Moreover, regarding an externally wound part, at which the wound reached the belt layer in the circumferential direction, of each tire, the development length of rust of a cut portion was measured. In the case where there was a portion in which the length was 30 mm or more, the corrosion propagation resistance was evaluated as poor, and in the case where the lengths were less than 30 mm, the corrosion propagation resistance was evaluated as good.

The results thereof are also shown in Table 1 described below.

TABLE 1

| | | Comparative example | Example 1 | Example 2 | Example 3 |
|---|---|---|---|---|---|
| Cord structure | | 2 × 0.185 mm + 6 + 11 × 0.26 mm | 5 × (2 × 0.185 mm + 6 + 11 × 0.26 mm) | 5 × (2 × 0.36 mm + 8 × 0.34 mm) | 5 × (1 + 6 × 0.34 mm) |
| Corresponding drawing | | FIG. 5 | FIG. 1 | FIG. 2 | FIG. 3 |
| Patterning with corrugated shape 2a/λ | | 0.078 | — | — | — |
| Strand | Major diameter d1(mm) | — | 1.42 | 1.41 | 1.25 |
| | Minor diameter d2(mm) | — | 1.29 | 1.19 | 1.07 |
| d1/d2 | | — | 1.10 | 1.18 | 1.17 |
| Cord | Major diameter D1(mm) | — | 4.32 | 4.23 | 3.87 |
| | Minor diameter D2(mm) | — | 4.19 | 4.01 | 3.69 |
| D1/D2 | | — | 1.03 | 1.05 | 1.05 |
| Cord pitch P(mm) | | — | 30 | 30 | 30 |
| $\epsilon_c$ | | — | 0.0157 | 0.0157 | 0.0156 |
| The number of embedded reinforcing members (members/100 mm) | | 45 | 21.1 | 21.7 | 15.9 |
| The number of crown strengthening layers | | 2 layers | 1 layer | 1 layer | 2 layers |
| uneven wear resistance | | poor | good | good | good |
| corrosion propagation resistance | | poor | good | good | good | substantially the same direction and were the same direction with respect to the longitudinal direction of the cord.

Figure 6:
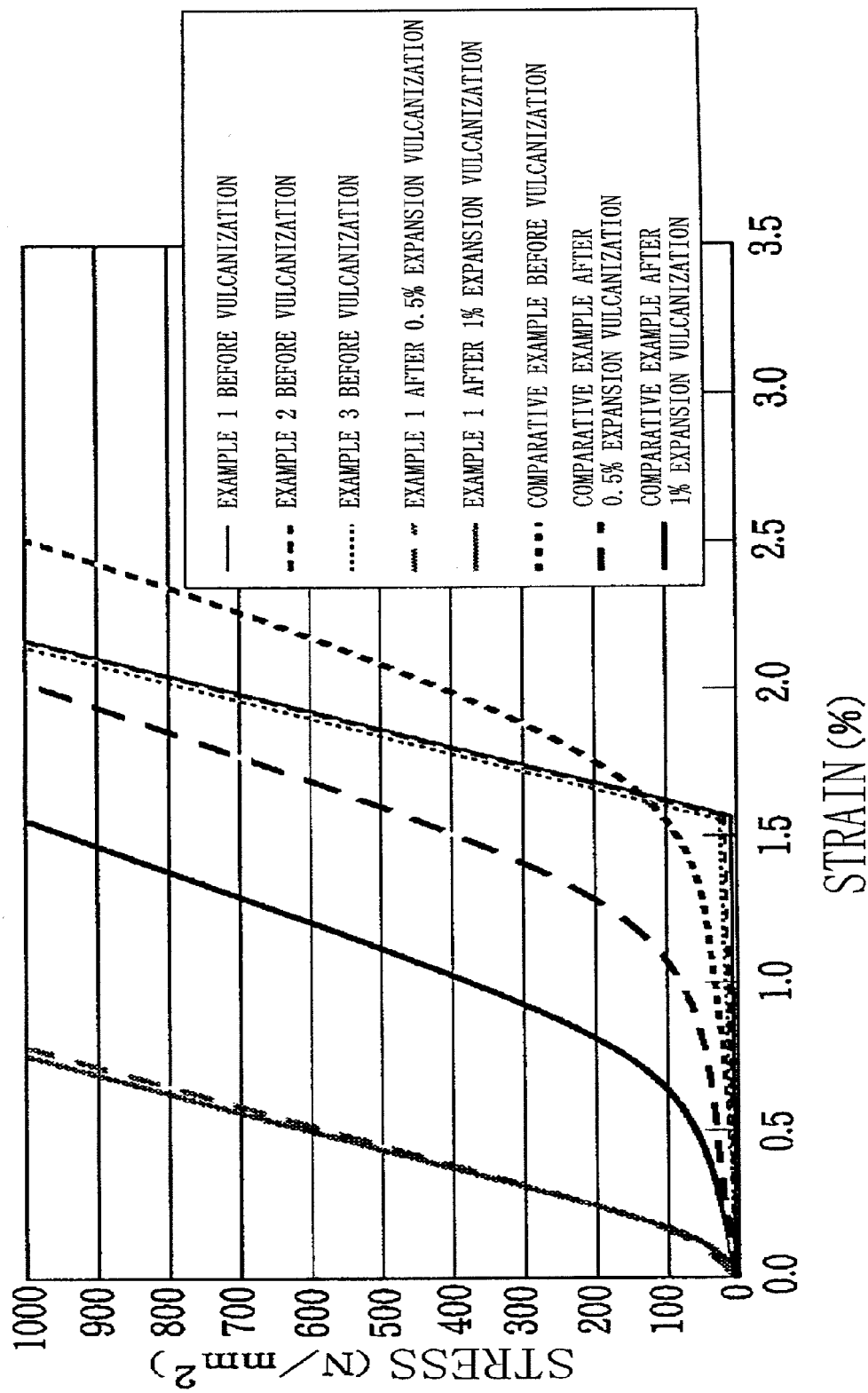
FIG. 6 is a graph showing the relationship between the strain and the stress with respect to composites of rubber and steel cord of Comparative example and Examples.

Regarding each of the resulting composites, the relationship between the strain and the stress was evaluated. The results are shown in a graph in FIG. 6. In the drawing, the values of after 0.5% expansion vulcanization and after 1% expansion vulcanization are values measured after each composite was vulcanized while being expanded by 0.5% and 1%, respectively. As is clear from the results shown in FIG. 6, the composites of Examples exhibit low rigidity and good processability before vulcanization and exhibit the rigidity higher than that of the composite of Comparative example, which is a conventional product, after vulcanization. Furthermore, it is also clear that the properties after vulcanization are not easily affected by expansion in the vulcanization.

Figure 7:
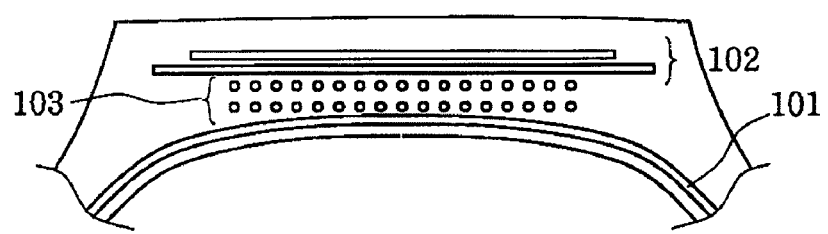
FIG. 7 is a magnified sectional view showing the vicinity of a tread portion of another example of a tire according to the present invention.

Next, regarding Comparative example and Example 3, the tire structure shown in FIG. 7 was employed, and regarding Examples 1 and 2, the tire structure shown in FIG. 4 was employed. The prepared composites were applied as reinforcing members for the crown strengthening layer. Four tires having a tire size of 265/60R22.5 were prepared for each composite and were set with a rim width of 8.25. The resulting tires were mounted on a commercial truck, and an internal pressure was raised to 900 kPa. Thereafter, the truck was traveled on 100,000 km of road composed of 30% of paved expressway and 70% of paved ordinary road while an average As shown in the above Table 1, it was ascertained that the tires of Examples 1 to 3 including multi-twist cords having $\epsilon_c$, which was defined by the above-described equation, satisfying $\epsilon_c > 0.005$ as reinforcing members, exhibited good productivity and excellent uneven wear resistance and corrosion propagation resistance.

The invention claimed is:

1. A steel cord comprises a multi-twist structure in which N (N=2 to 8) strands are twisted, each strand being formed by twisting a plurality of element wires and having a substantially elliptical cross-section, wherein d1/d2>1.08 is satisfied where the major diameter of the strand is represented by d1 and the minor diameter is represented by d2, and $\epsilon_c$ defined by the following equation:

$$\epsilon_c = \sqrt{(-b/2 + \sqrt{(b^2/4 - c)})} - 1$$

(in the equation, b represents $-1 + \pi^2(-4R^2 + d^2)/P^2$, c represents $\pi^2 d^2 k (4\pi^2 R^2 + P^2)/P^4$, R represents $(D-d)/2$, k represents $\tan^2(\pi/2 - \pi/N)$, and d represents $(d1+d2)/2$) satisfies $\epsilon_c > 0.005$, where the diameter of a circle circumscribing the cord is represented by D (mm) and the twist pitch of the cord is represented by P (mm).

2. The steel cord according to claim 1, wherein $\epsilon_c > 0.015$ is satisfied.

3. The steel cord according to claim 1, wherein all directions of major axes of the N strands are substantially the same direction and are the same direction with respect to the longitudinal direction of the cord.

4. The steel cord according to claim 1, wherein the cord has a substantially elliptical cross-section and D1/D2>1.02 is satisfied, where the major diameter of the cord is represented by D1 and the minor diameter is represented by D2.

5. The steel cord according to claim 1, wherein the structure of the N strands is a 2+n+m structure and two core element wires are substantially not twisted, but are arranged in parallel.

6. The steel cord according to claim 1, wherein the structure of the N strands is a 2+n structure and two core element wires are substantially not twisted, but are arranged in parallel.

7. The steel cord according to claim 1, wherein the structure of the N strands is a 1+n structure and one core element wire is patterned with a corrugated shape.

8. A composite of rubber and steel cord, wherein the steel cord according to claim 1 is embedded in the rubber.

9. The composite of rubber and steel cord according to claim 8, wherein at least one gap is present between the N strands.

10. A tire comprises a reinforcing layer in which the composite of rubber and steel cord according to claim 8 is used as a reinforcing member.

11. The tire according to claim 10, wherein the reinforcing layer is formed by winding the reinforcing member at least one turn around a tire crown portion.

12. A tire comprises at least one layer of carcass, which serves as a skeleton and which is present extending in a toroidal shape lying astride at least one pair of bead cores, and at least one layer of belt, which is disposed on the outer periphery of the carcass and which includes a reinforcing element composed of a plurality of cords or filaments having an inclination angle of 10° to 40° relative to a tire equator plane, wherein at least one crown strengthening layer formed from a strip, in which the composite of rubber and steel cord according to claim 8 is oriented along the circumferential direction of the tire as a whole, is disposed on the inner periphery of the belt and on the outer periphery of the carcass.

13. A tire comprises at least one layer of carcass, which serves as a skeleton and which is present extending in a toroidal shape lying astride at least one pair of bead cores, and at least two layers of interlacing belts, which are disposed on the outer periphery of the carcass and which include reinforcing elements composed of a plurality of cords or filaments having an inclination angle of 10° to 40° relative to a tire equator plane in such a way that the reinforcing elements of the two layers intersect with the equator plane therebetween, wherein at least one crown strengthening layer formed from a strip, in which the composite of rubber and steel cord according to claim 8 is oriented along the circumferential direction of the tire as a whole, is disposed on the inner periphery of the interlacing belt and on the outer periphery of the carcass.

* * * * *